(12) United States Patent
Nakazawa et al.

(10) Patent No.: US 12,147,249 B2
(45) Date of Patent: Nov. 19, 2024

(54) SENSING SYSTEM, SENSING DATA ACQUISITION METHOD, AND CONTROL DEVICE

(71) Applicant: RAKUTEN GROUP, INC., Tokyo (JP)

(72) Inventors: Mitsuru Nakazawa, Tokyo (JP); Jun Takizawa, Chino (JP)

(73) Assignee: Rakuten Group, Inc., Tokyo (JP)

( * ) Notice: Subject to any disclaimer, the term of this patent is extended or adjusted under 35 U.S.C. 154(b) by 289 days.

(21) Appl. No.: 17/595,339

(22) PCT Filed: Nov. 27, 2020

(86) PCT No.: PCT/JP2020/044196
§ 371 (c)(1),
(2) Date: Nov. 15, 2021

(87) PCT Pub. No.: WO2022/113260
PCT Pub. Date: Jun. 2, 2022

(65) Prior Publication Data
US 2023/0116047 A1      Apr. 13, 2023

(51) Int. Cl.
*G05D 1/12* (2006.01)
*A01G 25/16* (2006.01)
(Continued)

(52) U.S. Cl.
CPC ............ *G05D 1/12* (2013.01); *A01G 25/167* (2013.01); *B64C 39/024* (2013.01);
(Continued)

(58) Field of Classification Search
CPC ...... G05D 1/12; G05D 1/0044; G05D 1/0246; G05D 1/101; G06V 20/17; G06V 20/188;
(Continued)

(56) References Cited

U.S. PATENT DOCUMENTS

2016/0157414 A1*   6/2016   Ackerman ........... A01B 69/008
                                                              701/25
2016/0216245 A1    7/2016   Sutton
(Continued)

FOREIGN PATENT DOCUMENTS

JP         06-059733 A        3/1994
JP       2002168623 A   *    6/2002  ............ F41H 11/136
(Continued)

OTHER PUBLICATIONS

English Translation for JP-2002168623-A (Year: 2023).*
(Continued)

*Primary Examiner* — Mahmoud S Ismail
(74) *Attorney, Agent, or Firm* — Sughrue Mion, PLLC

(57) ABSTRACT

The sensing system S extracts a target area to be subjected to short-distance sensing by the UGV 2 on the basis of the long-distance sensing data obtained by the UAV 1 in the air performing long-distance sensing on a lower place, perform movement control for moving the UGV 2 toward the target area. And then, the sensing system S acquires short-distance sensing data obtained by performing short-distance sensing on the whole or a part of the target area by the UGV 2 that has moved according to the movement control.

19 Claims, 13 Drawing Sheets

(51) Int. Cl.
  *B64C 39/02* (2023.01)
  *G05D 1/00* (2006.01)
  *G06T 7/00* (2017.01)
  *G06V 20/10* (2022.01)
  *G06V 20/17* (2022.01)
  *G06V 20/56* (2022.01)
  *B64U 101/30* (2023.01)

(52) U.S. Cl.
  CPC ......... *G05D 1/0044* (2013.01); *G05D 1/0246* (2013.01); *G05D 1/101* (2013.01); *G06T 7/0012* (2013.01); *G06V 20/17* (2022.01); *G06V 20/188* (2022.01); *G06V 20/56* (2022.01); *B64U 2101/30* (2023.01); *G06T 2207/10032* (2013.01); *G06T 2207/30188* (2013.01); *G06V 2201/07* (2022.01)

(58) Field of Classification Search
  CPC .. G06V 20/56; G06V 2201/07; A01G 25/167; B64C 39/024; G06T 7/0012; G06T 2207/10032; G06T 2207/30188; B64U 2101/30
  USPC ............................................................ 701/3
  See application file for complete search history.

(56) References Cited

U.S. PATENT DOCUMENTS

| | | | |
|---|---|---|---|
| 2016/0282864 A1* | 9/2016 | Lamm | G05D 1/028 |
| 2018/0156770 A1* | 6/2018 | Saez | G01N 33/02 |
| 2022/0065835 A1* | 3/2022 | Shore | A01N 25/00 |
| 2023/0136009 A1* | 5/2023 | Faers | A01M 21/043 47/1.7 |

FOREIGN PATENT DOCUMENTS

| | | |
|---|---|---|
| JP | 2011-254711 A | 12/2011 |
| JP | 2017-90115 A | 5/2017 |
| JP | 2018-021865 A | 2/2018 |

OTHER PUBLICATIONS

Extended European Search Report dated May 6, 2022 in European Application No. 20934878.8.

International Search Report for PCT/JP2020/044196 dated Feb. 2, 2021 (PCT/ISA/210).

* cited by examiner

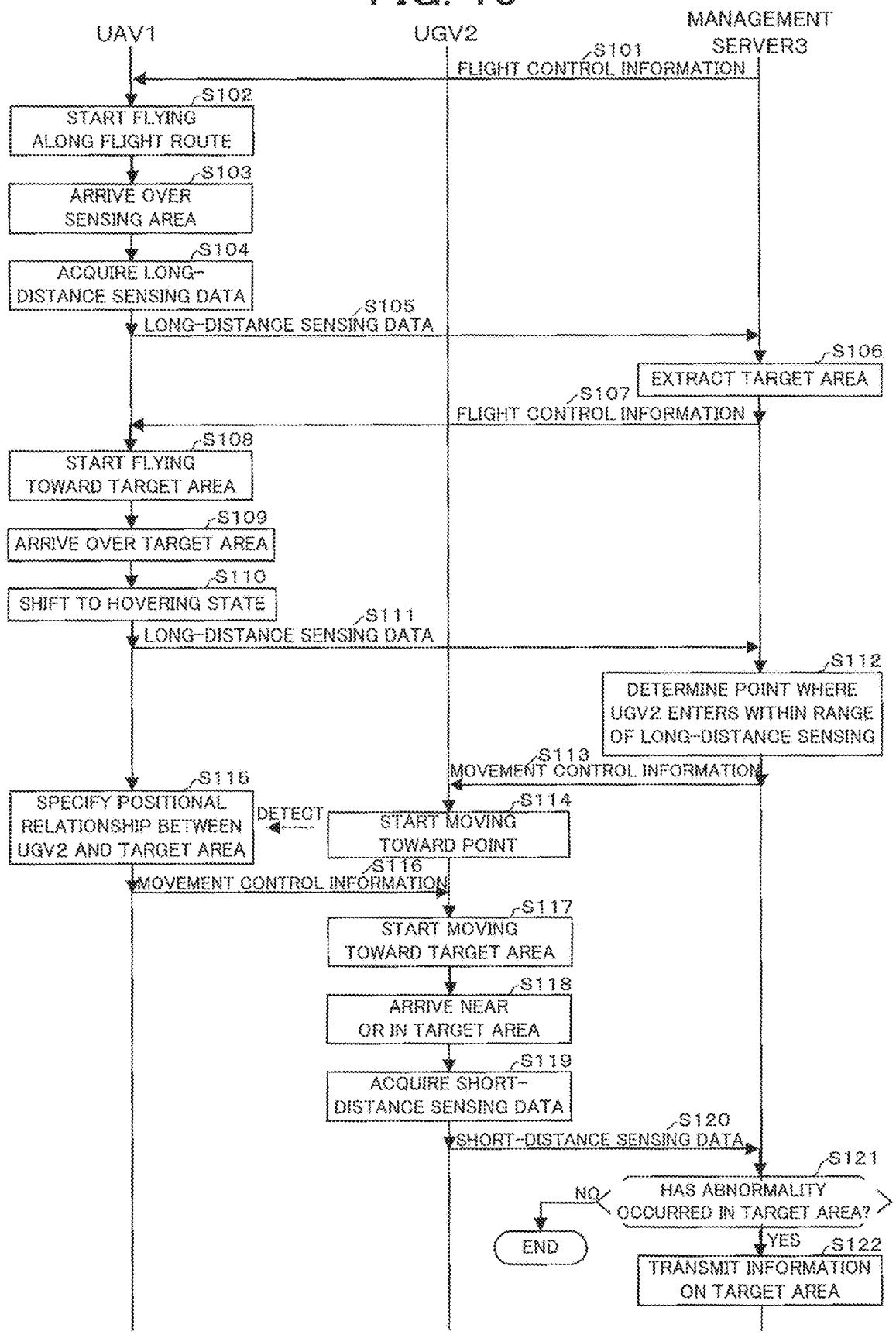

SENSING SYSTEM, SENSING DATA ACQUISITION METHOD, AND CONTROL DEVICE

CROSS REFERENCE TO RELATED APPLICATIONS

This application is a National Stage of International Application No. PCT/JP2020/044196 filed Nov. 27, 2020.

TECHNICAL FIELD

The present invention relates to a technical field such as a system that acquires sensing data obtained by a flying object sensing the ground from the sky.

BACKGROUND ART

In recent years, sensing such as capturing from the sky using a flying object is becoming common. For example, Patent Literature 1 describes that the entire farm field is photographed from a video camera mounted on an industrial unmanned helicopter to acquire data indicating images and reflectance of natural light.

CITATION LIST

Patent Literature

Patent Literature 1: JP 2011-254711 A

SUMMARY OF INVENTION

Technical Problem

By using a flying object as described above, a relatively wide range can be sensed comprehensively. However, in the case of finely sensing a relatively narrow range, it is difficult to say that sensing using a flying object is suitable. For example, when a flying object flies at a low altitude in order to perform sensing from a position as close to the ground as possible, ground effect may occur, causing the flying object to become unstable. Moreover, it is also possible to perform sensing in a state where the flying object has landed, but in this case, it is not preferable from the viewpoint of energy consumption in addition to the viewpoint of stability of the flying object. Moreover, in a case where the flying object performs sensing from the sky using a high magnification sensor, even a slight vibration during flight in the air has an influence according to the magnification, and thus fine sensing is difficult.

Therefore, one or more embodiments of the present invention are directed to providing a sensing system, a sensing data acquisition method, and a control device capable of acquiring suitable sensing data in consideration of advantages of both comprehensive sensing and fine sensing.

Solution to Problem

In response to the above issue, the invention according to claim 1 is a sensing system. The sensing system includes: a first acquisition unit configured to acquire first sensing data obtained by a flying object in the air sensing a lower place; an extraction unit configured to extract a target area sensed by a traveling object capable of traveling on the ground on the basis of the first sensing data; a control unit configured to perform movement control for moving the traveling object toward the target area; and a second acquisition unit configured to acquire second sensing data obtained by sensing a whole or a part of the target area by the traveling object that has moved according to the movement control. This makes it possible to acquire suitable sensing data in consideration of advantages of both comprehensive sensing and fine sensing in order to quickly find and investigate a target area.

The invention according to claim 2 is the information processing device according to claim 1 further including a display control unit configured to cause a display terminal to display information regarding the target area on the basis of the second sensing data. This makes it possible for a manager to visually grasp information regarding the extracted target area.

The invention according to claim 3 is the sensing system according to claim 1 or 2, wherein the extraction unit extracts, as the target area, an area having a high probability that an abnormality has occurred in the lower place, on the basis of the first sensing data. This makes it possible to acquire suitable sensing data in consideration of advantages of both comprehensive sensing and fine sensing in order to quickly find and investigate an area having a high probability that an abnormality has occurred.

The invention according to claim 4 is the sensing system according to any one of claims 1 to 3, wherein the first sensing data includes a vegetation activity image, and the extraction unit extracts the target area on the basis of an activity in the vegetation activity image. This makes it possible to acquire suitable sensing data in consideration of advantages of both comprehensive sensing and fine sensing in order to quickly find and investigate an area having a high probability that an abnormality has occurred in a plant.

The invention according to claim 5 is the sensing system according to any one of claims 1 to 4, wherein the second sensing data includes data related to at least one of moisture content, temperature, salinity concentration, electrical conductivity, and acidity in the ground of the target area. This makes it possible to more finely observe a state of a plant or soil.

The invention according to claim 6 is the sensing system according to any one of claims 1 to 5, wherein the second sensing data is acquired using a sensor inserted in the ground of the target area. This makes it possible to more finely observe a state of a plant or soil.

The invention according to claim 7 is the sensing system according to any one of claims 1 to 6 further including a determination unit configured to determine whether or not an abnormality has occurred in the target area on the basis of the second sensing data. This makes it possible to quickly and accurately determine whether an abnormality has occurred in the target area using sensing data in consideration of advantages of both comprehensive sensing and fine sensing.

The invention according to claim 8 is the sensing system according to claim 3 or 7, wherein the abnormality is an abnormality of any one of a plant, soil, and a road.

The invention according to claim 9 is the sensing system according to claim 8 further including a transmission unit configured to transmit the second sensing data to a terminal owned by a manager of any one of the plant, the soil, and the road. This makes it possible for the manager to confirm the second sensing data and to investigate in more detail whether an abnormality has occurred in a plant, soil, or a road.

The invention according to claim 10 is the sensing system according to any one of claims 1 to 9, wherein the control unit causes the traveling object to continuously perform sensing of the target area a plurality of times while moving the traveling object so that data on the entire target area is included in the second sensing data. Thus, even when the entire target area does not fall within an angle of view of a camera, for example, it is possible to obtain the second sensing data on the entire target area.

The invention according to claim 11 is the sensing system according to any one of claims 1 to 10 further including a third acquisition unit configured to acquire third sensing data obtained by sensing the ground by the traveling object before the traveling object is moved toward the target area, wherein the control unit performs movement control for moving the traveling object toward the target area on the basis of the first sensing data and the third sensing data. This makes it possible to accurately guide the traveling object to the target area.

The invention according to claim 12 is the sensing system according to claim 11, wherein the control unit performs movement control for moving the traveling object toward the target area detected from the third sensing data by matching the first sensing data with the third sensing data. This makes it possible to more accurately guide the traveling object to the target area.

The invention according to claim 13 is the sensing system according to any one of claims 1 to 12, wherein when the target area is extracted by the extraction unit, the control unit moves the traveling object into a range of the sensing performed by the flying object in a hovering state, and thereafter, performs movement control for moving the traveling object toward the target area on the basis of the first sensing data. This makes it possible to accurately guide the traveling object to the target area.

The invention according to claim 14 is the sensing system according to claim 13, wherein the flying object performs the sensing while moving along a predetermined flight route, and when the target area is extracted by the extraction unit, the control unit causes the flying object to interrupt the movement along the route and then shift to the hovering state. This makes it possible to accurately guide the traveling object to the target area.

The invention according to claim 15 is the sensing system according to any one of claims 1 to 13, wherein a distance between the target area and the flying object is longer than a distance between the target area and the traveling object.

The invention according to claim 16 is the sensing system according to any one of claims 1 to 15, wherein a range of the sensing performed by the flying object is larger than a range of the sensing performed by the traveling object.

The invention according to claim 17 is a sensing data acquisition method comprising: a step of acquiring first sensing data obtained by a flying object in the air sensing a lower place; a step of extracting a target area sensed by a traveling object capable of traveling on the ground on the basis of the first sensing data; a step of performing movement control for moving the traveling object toward the target area; and a step of acquiring second sensing data obtained by sensing a whole or a part of the target area by the traveling object that has moved according to the movement control.

The invention according to claim 18 is a control device including: a first acquisition unit configured to acquire first sensing data obtained by a flying object in the air sensing a lower place; an extraction unit configured to extract a target area sensed by a traveling object capable of traveling on the ground on the basis of the first sensing data; a control unit configured to perform movement control for moving the traveling object toward the target area; and a second acquisition unit configured to acquire second sensing data obtained by sensing a whole or a part of the target area by the traveling object that has moved according to the movement control.

Advantageous Effect of the Invention

According to one or more embodiments of the present invention, it is possible to acquire suitable sensing data in consideration of advantages of both comprehensive sensing and fine sensing.

BRIEF DESCRIPTION OF THE DRAWINGS

FIG. 13 is a sequence diagram illustrating an example of processing executed among the UAV 1, the UGV 2, and the management server 3 in Example 5.

DESCRIPTION OF EMBODIMENTS

Hereinafter, an embodiment of the present invention will be described with reference to the drawings.

[1. Configuration of Sensing System S]

Figure 1:
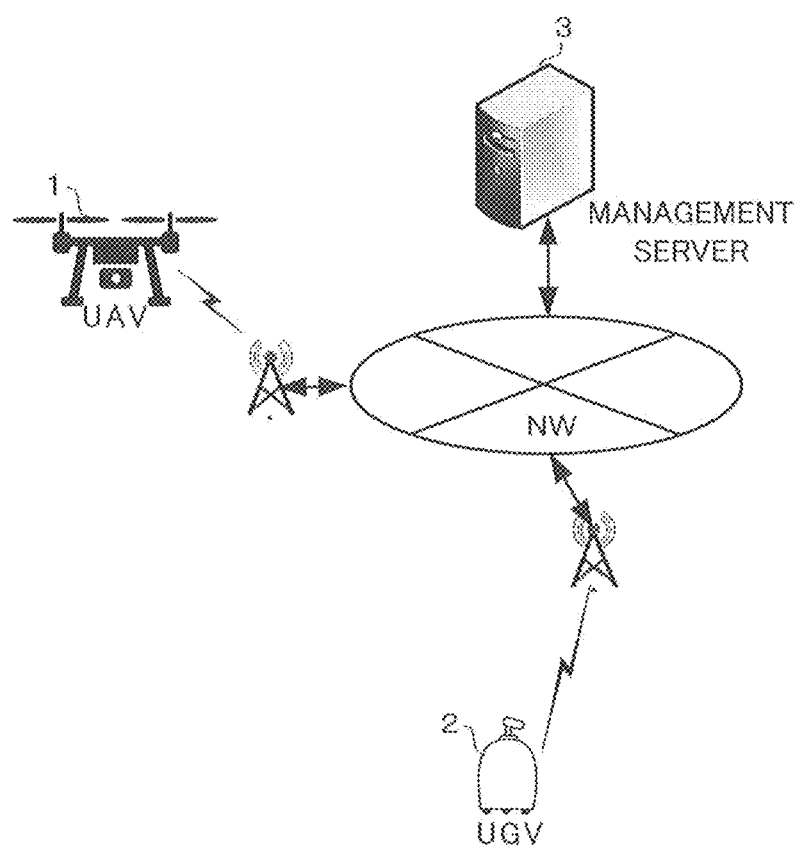
FIG. 1 is a diagram illustrating a schematic configuration example of a sensing system S

First, an outline of a configuration of a sensing system S according to an embodiment of the present invention will be described with reference to FIG. 1. FIG. 1 is a diagram illustrating a schematic configuration example of a sensing system S. As illustrated in FIG. 1, the sensing system S includes an unmanned aerial vehicle (hereinafter referred to as an UAV (Unmanned Aerial Vehicle) 1, an unmanned ground vehicle (hereinafter referred to as an UGV (Unmanned Ground Vehicle) 2, and a management server 3. The UAV 1 and the UGV 2 can individually communicate with the management server 3 via a communication network NW.

The communication network NW includes, for example, the Internet, a mobile communication network, a radio base station thereof, and the like.

Incidentally, the UAV 1 is an example of a flying object, and is also called a drone or a multicopter. The UAV 1 can fly under remote control by an operator from the ground, or fly autonomously. Moreover, the UAV 1 is managed by a GCS (Ground Control Station). For example, the GCS may be mounted on a pilot terminal operated by an operator as an application, or may be configured by a server such as the management server 3.

On the other hand, the UGV 2 is an example of a traveling object that can autonomously travel on the ground in an unmanned manner. Here, traveling means moving on the ground (which may include on a plant or an obstacle), and is distinguished from flight. Moreover, moving means that the current position changes in time series. The UGV 2 may be a vehicle having a plurality of wheels, a robot (for example, a biped walking robot) having no wheels, or the like.

[1-1. Configuration and Function of UAV 1]

Figure 2:
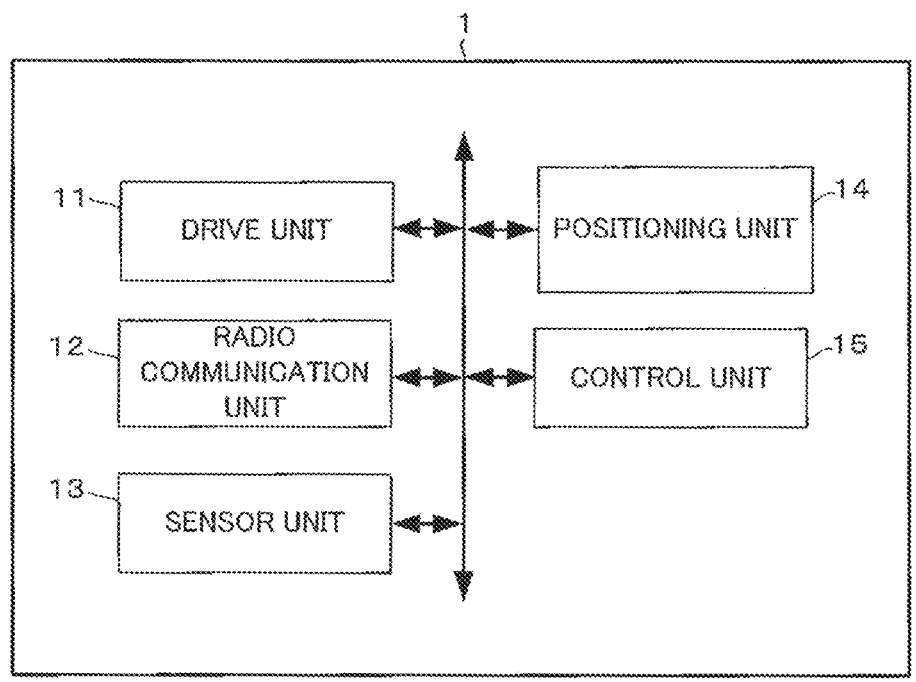
FIG. 2 is a diagram illustrating a schematic configuration example of an UAV 1
Figure 3:
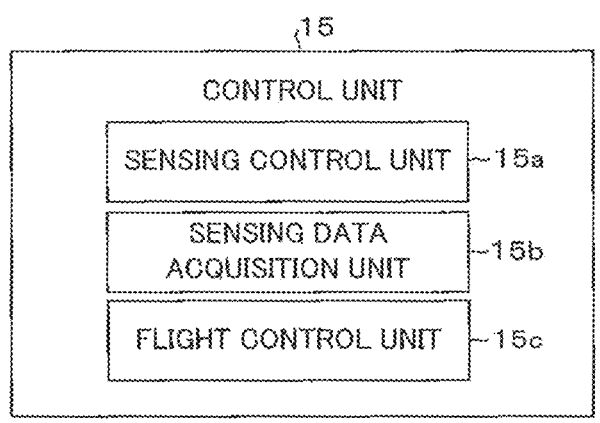
FIG. 3 is a diagram illustrating an example of functional blocks in a control unit 15.

Next, the configuration and function of the UAV 1 will be described with reference to FIGS. 2 and 3. FIG. 2 is a diagram illustrating a schematic configuration example of the UAV 1. As illustrated in FIG. 2, the UAV 1 includes a drive unit 11, a radio communication unit 12, a sensor unit 13, a positioning unit 14, a control unit 15, and the like. FIG. 3 is a diagram illustrating an example of functional blocks in the control unit 15. Incidentally, although not illustrated, the UAV 1 includes a rotor (propeller) that is a horizontal rotary wing, and a battery that supplies electric power to each unit of the UAV 1.

The drive unit 11 includes a motor, a rotating shaft, and the like. The drive unit 11 rotates a plurality of rotors by a motor, a rotating shaft, and the like that are driven according to a control signal output from the control unit 15. The radio communication unit 12 controls communication with the management server 3 via the communication network NW. Moreover, The radio communication unit 12 may have a short-distance radio communication function such as Bluetooth (registered trademark).

The sensor unit 13 includes various sensors necessary for flight control of the UAV 1. Examples of the various sensors include an optical sensor, a triaxial angular velocity sensor, a triaxial acceleration sensor, a geomagnetic sensor, and the like. Detection data detected by the sensor unit 13 is output to the control unit 15. The optical sensor includes, for example, a camera (an RGB camera or an infrared camera), and is also used to perform comprehensive sensing (hereinafter, referred to as "long-distance sensing (an example of first sensing)") from the air to a lower place.

Here, the long-distance sensing includes observing a state of the ground surface (for example, a state of a plant or soil) by capturing an image of the ground surface within a sensable range (for example, a range falling within the angle of view of the camera) below the UAV 1 in the air. Incidentally, the optical sensor may include LIDAR (Light Detection and Ranging, or Laser Imaging Detection and Ranging) in order to create a map image to be described later.

An area to be subjected to long-distance sensing (hereinafter, referred to as a "sensing area") is a wide area which needs to be sensed from the sky. In particular, an area where care (in other words, maintenance and management) for a plant growing from the ground is important may be set as the sensing area. Examples of the sensing area include a golf course and a ball game ground where lawn is grown, a farm field where crops and the like are grown, and the like.

The long-distance sensing is performed once or more, for example, when the UAV 1 arrives at the sensing area or while flying on a flight route inside and outside the sensing area. In order to improve the accuracy of the long-distance sensing, the long-distance sensing may be continuously performed in time series, and a time interval of the long-distance sensing may be a regular interval or an irregular interval.

The positioning unit 14 includes a radio wave receiver, an altitude sensor, and the like. For example, the positioning unit 14 receives a radio wave transmitted from satellites of a GNSS (Global Navigation Satellite System) by the radio waver receiver, and detects a current position (latitude and longitude) of the UAV 1 in the horizontal direction on the basis of the radio wave. The current position of the UAV 1 is a flight position of the UAV 1 in flight.

Incidentally, the current position of the UAV 1 in the horizontal direction may be corrected based on an image captured by an optical sensor or a radio wave transmitted from the radio base station. Position information indicating the current position detected by the positioning unit 14 is output to the control unit 15. Furthermore, the positioning unit 14 may detect the current position (altitude) of the UAV 1 in the vertical direction by an altitude sensor such as an atmospheric pressure sensor. In this case, the position information includes altitude information indicating the altitude of the UAV 1.

The control unit 15 includes at least one CPU (Central Processing Unit), which is a processor, a ROM (Read Only Memory), a RAM (Random Access Memory), a non-volatile memory, and the like. The control unit 15 functions as a sensing control unit 15a, a sensing data acquisition unit 15b (an example of a first acquisition unit), and a flight control unit 15c, as illustrated in FIG. 3, according to a program (program code group) stored in, for example, the ROM or the non-volatile memory. Incidentally, the control unit 15 causes the radio communication unit 12 to sequentially transmit the position information and flying object ID of the UAV 1 to the management server 3 (or the management server 3 via the GCS) while the UAV 1 is in flight. The flying object ID is identification information that enables the UAV 1 to be identified.

The sensing control unit 15a controls timing of long-distance sensing performed by the sensor unit 13. The timing of long-distance sensing may be defined in advance in the program, or may be indicated by a sensing control command from the GCS or the management server 3.

The sensing data acquisition unit 15b acquires long-distance sensing data (an example of first sensing data) obtained by the long-distance sensing. The long-distance sensing data is transmitted to the management server 3 by the radio communication unit 12, and is used to extract a target area to be sensed by the UGV 2. An example of the target area includes an area having a high probability that an abnormality has occurred in a plant or soil below the UAV 1.

Here, "below the UAV 1" means "in an area below the UAV 1 at the time of long-distance sensing". This is because even though the target area is below the UAV 1 at the time of long-distance sensing by the UAV 1, the UAV 1 may be moving at the time when the target area is extracted. The long-distance sensing data may be raw detection data output from the sensor unit 13 or may be data analyzed and processed based on the output raw detection data.

Moreover, the long-distance sensing data is, for example, data constituting at least one map image among an RGB image, a vegetation activity image, a thermal image (temperature distribution image), and the like of the ground surface. Here, the vegetation activity image is an image in which the presence or absence and the number of plants such as lawn and crops are color-coded. The activity (vegetation activity) may be represented by a NDVI (Normalized Difference Vegetation Index).

NDVI is a value (index) indicating a relationship between the health state of a plant and the reflectance at wavelengths in visible to near-infrared ranges. For example, plants have a characteristic of absorbing radio waves in the visible range and strongly reflecting radio waves in the near infrared range, and thus a higher NDVI means a healthier state. Position information is associated with each pixel value (equivalent to, for example, an RGB value, an activity, or a temperature, which are measured values) in the map image. Such position information (that is, position information in the long-distance sensing data) is identified by, for example, position information indicating the current position of the UAV 1 in the horizontal direction and a SLAM (Simultaneous Localization And Mapping) process (a process of simultaneously performing map generation and self-position estimation).

The flight control unit 15c performs flight control for flying the UAV 1 inside and outside the sensing area. In such flight control, the number of rotations of the rotor and the position, attitude, and traveling direction of the UAV 1 are controlled using detection data from the sensor unit 13, position information from the positioning unit 14, flight control information from the management server 3, and the like. Here, the flight control information includes, for example, a flight command along a flight route. The flight route is determined in advance by the management server 3, for example. The flight control information enables the UAV 1 to perform long-distance sensing while flying on the flight route.

Incidentally, flying the UAV 1 includes hovering the UAV 1. Here, hovering is not limited to completely staying still of the UAV 1 in the air, and some movement (that is, moving in a horizontal direction, a vertical direction, or an oblique direction) of the UAV 1 may occur (that is, the UAV 1 may be floating in the air without landing).

The flight control unit 15c can remotely control or autonomously fly the UAV 1 inside and outside the sensing area. Incidentally, autonomously flying the UAV 1 is not limited to the autonomous flight controlled by the flight control unit 15c, and also includes, for example, autonomous flight controlled by the entire sensing system S.

[1-2. Configuration and Function of UGV 2]

Figure 4:
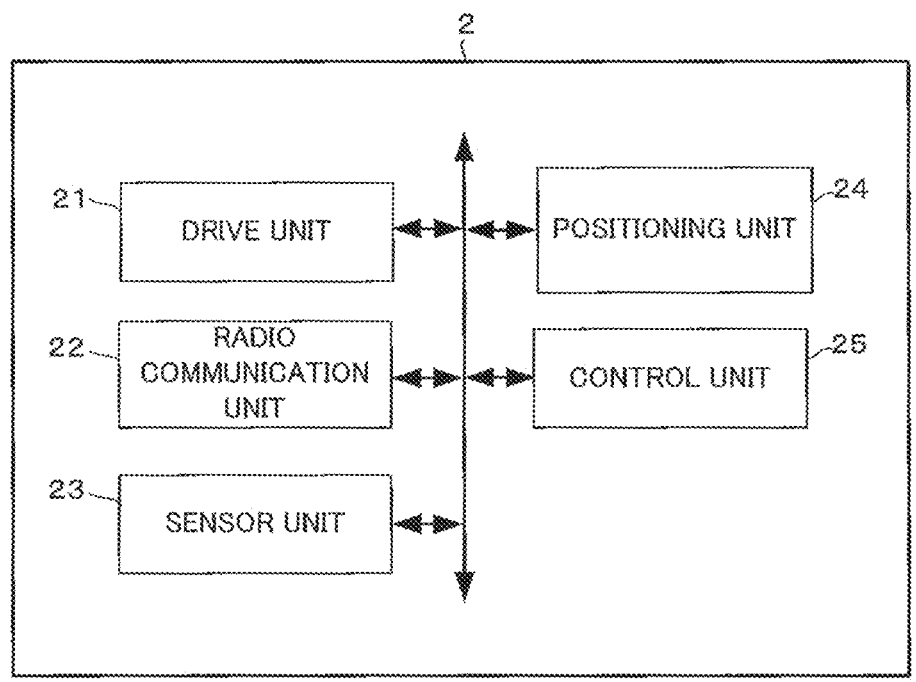
FIG. 4 is a diagram illustrating a schematic configuration example of an UGV 2.
Figure 5:
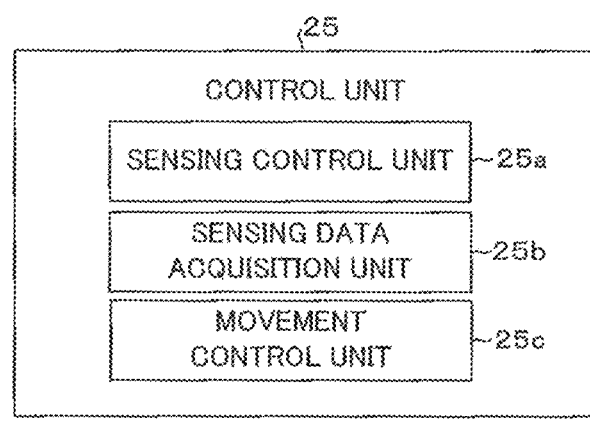
FIG. 5 is a diagram illustrating an example of functional blocks in a control unit 25.

Next, the configuration and function of the UGV 2 will be described with reference to FIGS. 4 to 6. FIG. 4 is a diagram illustrating a schematic configuration example of the UGV 2. As illustrated in FIG. 4, the UGV 2 includes a drive unit 21, a radio communication unit 22, a sensor unit 23, a positioning unit 24, a control unit 25, and the like. FIG. 5 is a diagram illustrating an example of functional blocks in the control unit 25. Incidentally, although not illustrated, the UGV 2 includes a battery that supplies power to each unit of the UGV 2. The drive unit 21 includes a motor, a rotating shaft, and the like. The drive unit 21 rotates a plurality of wheels by a motor, a rotating shaft, and the like that are driven according to a control signal output from the control unit 25. The radio communication unit 22 controls communication with the management server 3 via the communication network NW. Moreover, the radio communication unit 22 may have a short-distance radio communication function such as Bluetooth (registered trademark).

The sensor unit 23 includes various sensors necessary for movement control of the UGV 2. Examples of the various sensors include an optical sensor. Detection data detected by the sensor unit 23 is output to the control unit 25. The optical sensor includes, for example, a camera, and is also used to finely sense (hereinafter, referred to as "short-distance sensing (an example of second sensing)") a whole or a part of the target area extracted based on the long-distance sensing data.

Here, the short-distance sensing includes observing a state of the ground surface (for example, a state of a plant or soil) by capturing an image of the ground surface in a target area within a sensable range. Incidentally, the optical sensor may include LiDAR in order to create a map image. FIG. 6 is a diagram illustrating a relationship between a range of the long-distance sensing performed by the UAV 1 (that is, a sensable range) and a range of the short-distance sensing performed by the UGV 2. As illustrated in FIG. 6, a range R1 of the long-distance sensing performed in a sensing area (for example, a golf course) A1 is wider than a range R2 of the short-distance sensing performed in a target area A2.

Figure 6:
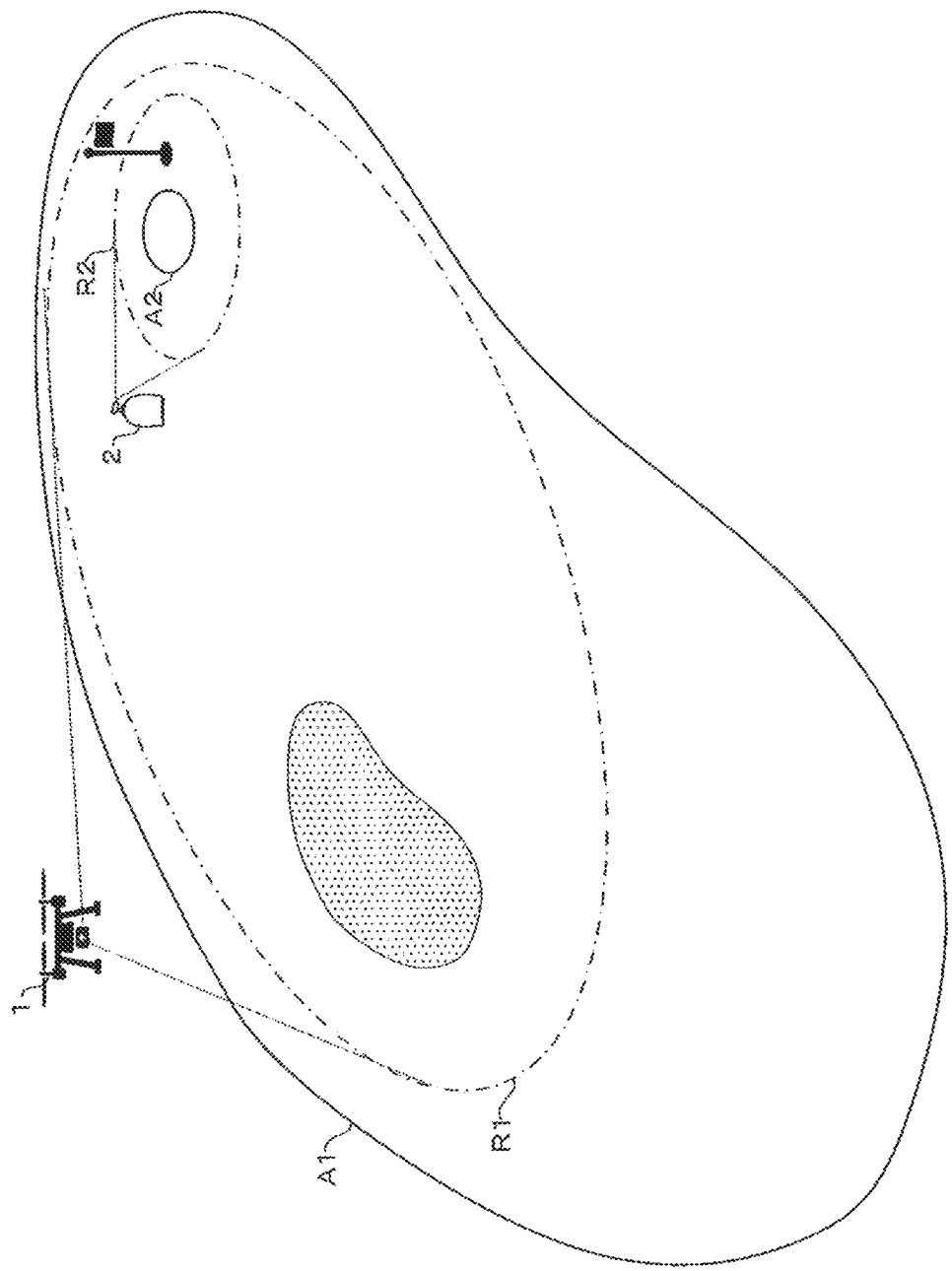
FIG. 6 is a diagram illustrating a relationship between a range of a long-distance sensing performed by the UAV 1 and a range of a short-distance sensing performed by the UGV 2.

Moreover, in the example of FIG. 6, the range R2 of the short-distance sensing is wider than the target area A2 (that is, the target area A2 is included in the range R2 of the short-distance sensing), but the range R2 of the short-distance sensing may be narrower than the target area A2 (for example, the entire target area A2 does not fall within the angle of view of the camera). In this case, the entire target area A2 may be sensed by continuously performing short-distance sensing on the target area A2 a plurality of times. Incidentally, for example, at the time of short-distance sensing, the distance between the target area A1 and the UAV 1 is larger (longer) than the distance between the target area A2 and the UGV 2.

Moreover, the sensor unit 23 may include a soil sensor. In this case, the short-distance sensing includes measuring at least one of moisture content (water content), temperature, salinity concentration, electrical conductivity, and acidity in the ground of the target area. Such short-distance sensing allows the state of a plant or soil to be finely observed. Moreover, the UGV 2 includes an arm (for example, a hydraulic arm) for inserting the soil sensor into the ground of the target area. This arm is driven by the drive unit 21.

The short-distance sensing is performed once or more, for example, when the UGV 2 arrives near or in the target area. In order to improve the accuracy of the short-distance sensing, the short-distance sensing may be continuously performed in time series, and a time interval of the short-distance sensing may be a regular interval or an irregular interval.

Incidentally, before the UGV 2 moves toward the target area, sensing the ground may be performed by the optical sensor. Such sensing is referred to as "ground sensing (an example of third sensing)".

The positioning unit 24 includes a radio wave receiver and the like. For example, the positioning unit 24 receives a radio wave transmitted from satellites of GNSS by the radio wave receiver, and detects the current position (latitude and longitude) of the UGV 2 on the basis of the radio wave. Incidentally, the current position of the UGV 2 may be identified by the SLAM process in addition to the radio wave transmitted from the GNSS satellite. Moreover, the current position of the UGV 2 may be corrected based on the image captured by the optical sensor. Position information indicating the current position detected by the positioning unit 24 is output to the control unit 25.

The control unit 25 includes a CPU, a ROM, a RAM, a non-volatile memory, and the like. The control unit 25 functions as a sensing control unit 25a, a sensing data acquisition unit 25b (an example of a second acquisition unit and a third acquisition unit), and a movement control unit 25c, as illustrated in FIG. 5, according to a program (program code group) stored in, for example, the ROM or the non-volatile memory. Incidentally, the control unit 25 causes the radio communication unit 22 to sequentially transmit the position information and traveling object ID of the UGV 2 to the management server 3. The traveling object ID is identification information that enables the UGV 2 to be identified.

The sensing control unit 25a controls each timing of the short-distance sensing and the ground sensing performed by the sensor unit 23. The timings of the short-distance sensing and the ground sensing may be defined in advance in the program or may be indicated by a sensing control command from the management server 3.

The sensing data acquisition unit 25b acquires short-distance sensing data (an example of second sensing data) obtained by the short-distance sensing. The short-distance sensing data is transmitted to the management server 3 by the radio communication unit 22, and is used, for example, to determine whether or not an abnormality has occurred in the target area extracted based on the long-distance sensing data. The short-distance sensing data may be raw detection data output from the sensor unit 23 or may be data analyzed and processed based on the output raw detection data.

Moreover, the short-distance sensing data may be data constituting at least one map image among an RGB image, a vegetation activity image, a thermal image, and the like of the ground surface in the target area. Position information is associated with each pixel value (equivalent to, for example, an RGB value, an activity, or a temperature) in the map image Such position information (that is, position information in the short-distance sensing data) is identified by, for example, position information indicating the current position of the UGV 2 and the SLAM process.

Moreover, in the case where the sensor unit 23 includes a soil sensor (that is, in a case where the short-distance sensing data is acquired using the soil sensor inserted in the ground), the short-distance sensing data includes data related to at least one of moisture content, temperature, salinity concentration, electrical conductivity, and acidity in the ground of the target area. Such data may be associated with the position information described above. Incidentally, the sensing data acquisition unit 25b may acquire the ground sensing data (an example of third sensing data) obtained by the ground sensing. The ground sensing data is transmitted to the management server 3 by the radio communication unit 22.

The movement control unit 25c performs movement control for moving the UGV 2 toward the target area. In such movement control, the number of rotations of the wheel and the position and traveling direction of the UGV 2 are controlled using detection data from the sensor unit 23, position information from the positioning unit 24, movement control information from the management server 3, and the like. Here, the movement control information includes, for example, a movement command for moving the UGV 2 toward the target area. The movement control unit 25c can move the UGV 2 toward the target area. Then, the UGV 2 that has moved according to the movement control can sense a whole or a part of the target area by the sensor unit 23.

[1-3. Configuration and Function of Management Server 3]

Figure 7:
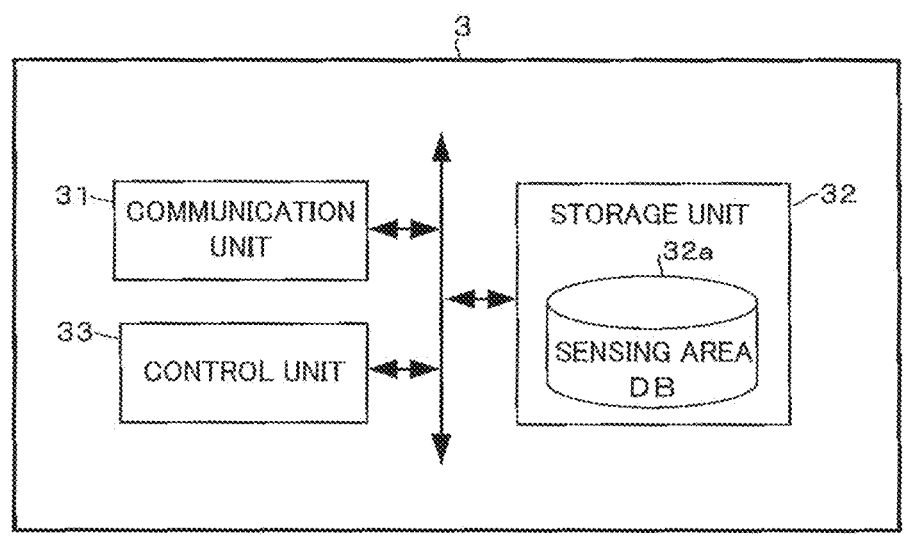
FIG. 7 is a diagram illustrating a schematic configuration example of the management server 3.
Figure 8:
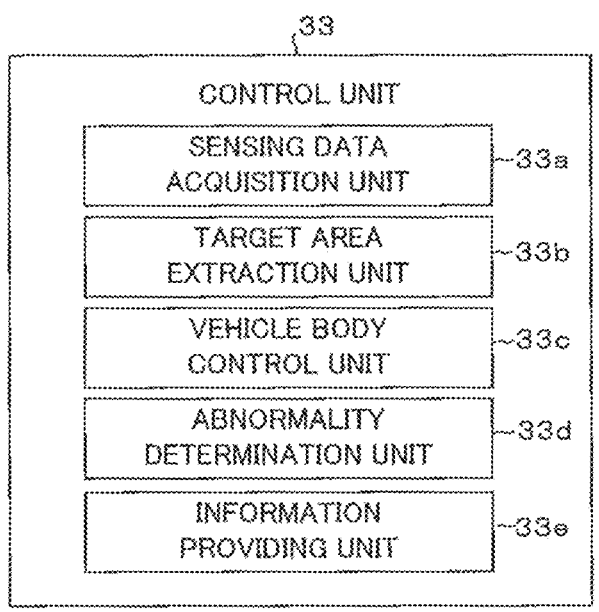
FIG. 8 is a diagram illustrating an example of functional blocks in a control unit 33.

Next, the configuration and function of the management server 3 will be described with reference to FIGS. 7 and 8. FIG. 7 is a diagram illustrating a schematic configuration example of the management server 3. As illustrated in FIG. 7, the management server 3 includes a communication unit 31, a storage unit 32, a control unit 33, and the like. FIG. 8 is a diagram illustrating an example of functional blocks in the control unit 33. The communication unit 31 controls communication with each of the UAV 1 and the UGV 2 via the communication network NW. The long-distance sensing data and the position information and flying object ID of the UAV 1 transmitted from the UAV 1 are received by the communication unit 31. The management server 3 can recognize the current position of the UAV 1 from the position information of the UAV 1.

Moreover, the short-distance sensing data, the ground sensing data, and the position information and flying object ID of the UGV 2 transmitted from the UGV 2 are received by the communication unit 31. The management server 3 can recognize the current position of the UGV 2 from the position information of the UGV 2. The storage unit 32 includes, for example, a hard disk drive and the like. The storage unit 32 is provided with a sensing database (DB) 32a.

The sensing database 32a stores position information of a sensing area, long-distance sensing data obtained by long-distance sensing in the sensing area, the flying object ID of the UAV 1 that has performed the long-distance sensing, position information of a target area extracted from the sensing area, short-distance sensing data obtained by short-distance sensing in the target area, the traveling object ID of the UGV 2 that has performed the short-distance sensing, and the like in association with each target area. Here, the position information of the sensing area may indicate the latitude and longitude of the outer edge of the sensing area. Similarly, the position information of the target area may indicate the latitude and longitude of the outer edge of the target area. Incidentally, in association with the position information of the sensing area, authentication information (ID and password) and an e-mail address of a manager or the like involved in the sensing area may be stored in the storage unit 32.

The control unit 33 includes a CPU, which is a processor, a ROM, a RAM, a non-volatile memory, and the like. The control unit 33 functions as a sensing data acquisition unit 33a (an example of a first acquisition unit, a second acquisition unit, and a third acquisition unit), a target area extraction unit 33b (an example of an extraction unit), a vehicle body control unit 33c, an abnormality determination unit 33d (an example of a determination unit), an information providing unit 33e (an example of a display control unit and a transmission unit), and the like as illustrated in FIG. 8, according to a program (program code group) stored in, for example, the ROM or the non-volatile memory.

The sensing data acquisition unit 33a acquires the long-distance sensing data transmitted from the UAV 1 via the communication unit 31. Moreover, the sensing data acquisition unit 33a acquires the short-distance sensing data transmitted from the UGV 2 via the communication unit 31. Moreover, the sensing data acquisition unit 33a acquires the ground sensing data transmitted from the UGV 2 via the communication unit 31.

The target area extraction unit 33b extracts a target area sensed by the UGV 2 on the basis of the long-distance sensing data acquired by the sensing data acquisition unit 33a. For example, the target area extraction unit 33b extracts, as the target area, an area having a high probability that an abnormality has occurred in an area below the UAV 1 (abnormality candidate area) on the basis of the long-distance sensing data. Such target area may be extracted based on the activity in the vegetation activity image included in the long-distance sensing data. As a result, it is possible to quickly find an area having a high probability that an abnormality has occurred in a plant. For example, an area having an activity equal to or lower than a threshold value in the vegetation activity image is extracted as the target area.

Alternatively, the target area may be extracted based on the RGB values of the RGB image included in the long-distance sensing data. For example, in the RGB image, an area having a difference from a predetermined appropriate color (RGB value) of a plant that is equal to or larger than a threshold value is extracted as the target area. Alternatively, the target area may be extracted based on the temperature in the thermal image included in the long-distance sensing data. For example, an area having a difference from a predetermined appropriate temperature equal to or larger than a threshold value in the thermal image is extracted as the target area. Incidentally, the target area may be extracted based on any two or more measurement values of the activity in the vegetation activity image, the RGB value in the RGB image, and the temperature in the thermal image.

The vehicle body control unit 33c can perform flight control for flying the UAV 1 inside and outside the sensing area. For example, the vehicle body control unit 33c controls flight of the UAV 1 by causing the communication unit 31 to transmit flight control information to the UAV 1. Moreover, the vehicle body control unit 33c can perform movement control for moving the UGV 2 toward the target area extracted by the target area extraction unit 33b. For example, the vehicle body control unit 33c controls movement of the UGV 2 by causing the communication unit 31 to transmit movement control information to the UGV 2.

The movement control of the UGV 2 may be performed based on the position information of the UAV 1 and the long-distance sensing data (for example, RGB image) from the UAV 1. For example, before moving the UGV 2 toward the target area extracted by the target area extraction unit 33b, the vehicle body control unit 33c moves the UGV 2 into the range of the long-distance sensing performed by the UAV 1 (for example, the photographing range of the camera of the UAV 1) on the basis of the position information of the UAV 1. That is, the vehicle body control unit 33c moves the UGV 2 to a position close to the UAV 1 to some extent. At this time, the sensing data acquisition unit 33a acquires long-distance sensing data obtained by the UAV 1 performing long-distance sensing and ground sensing data obtained by the UGV 2 performing ground sensing.

The vehicle body control unit 33c performs movement control for moving the UGV 2 toward the target area on the basis of the long-distance sensing data and the ground sensing data acquired at this time. For example, the vehicle body control unit 33c performs movement control for moving the UGV 2 toward the target area detected from the ground sensing data by matching the long-distance sensing data with the ground sensing data. As a result, it possible to more accurately guide the UGV 2 to the target area.

Incidentally, matching between the long-distance sensing data and the ground sensing data is performed, for example, by extracting feature points (for example, a feature point having the largest matching degree) corresponding to several feature points in the map image (for example, an RGB image) included in the long-distance sensing data from the map image included in the ground sensing data. Incidentally, the UAV 1 performs long-distance sensing (for example, captures an image) by directing the camera toward the target area from the side where the UGV 2 will view with the camera, thereby allowing easier matching.

Moreover, when the target area is extracted by the target area extraction unit 33b, the vehicle body control unit 33c may perform control to cause the UAV 1 to interrupt its movement (for example, movement along the flight route) and then to shift to a hovering state. For example, the target area extraction unit 33b causes the UAV 1 to hover over the target area. Then, the vehicle body control unit 33c moves the UGV 2 into the range (for example, the photographing range of the camera of the UAV 1) of the long-distance sensing performed by the UAV 1 in the hovering state. Incidentally, the UGV 2 may be moved to the vicinity directly below the UAV 1.

Thereafter, the vehicle body control unit 33c performs movement control for moving the UGV 2 toward the target area on the basis of the long-distance sensing data. For example, the vehicle body control unit 33c continues to acquire a positional relationship between the UGV 2 and the target area from the long-distance sensing data (for example, an RGB image) continuously received a plurality of times from the UAV 1, and moves the UGV 2 toward the target area. As a result, it possible to more accurately guide the UGV 2 to the target area.

Moreover, in a case where the UGV 2 performs short-distance sensing with the camera, when the entire target area does not fall within the angle of view of the camera, the vehicle body control unit 33c may perform control to cause the UGV 2 to continuously perform short-distance sensing of the target area a plurality of times while moving the UGV 2 so that data on the entire target area (for example, a map image including the entire target area) is included in the short-distance sensing data. As a result, even when the entire target area does not fall within the angle of view of the camera, it is possible to obtain the short-distance sensing data (for example, a plurality of still images or moving images) on the entire target area.

Incidentally, whether or not the entire target area falls within the angle of view of the camera may be determined by the control unit 33 or by the UGV 2. In the case of making such determination by the control unit 33, the vehicle body control unit 33c determines a travel route so that data on the entire target area is included in the short-distance sensing data, and then causes the communication unit 31 to transmit movement control information including a movement command along the determined travel route and an execution command of short-distance sensing to the UGV 2. On the other hand, in the case of making such determination by the UGV 2, the UGV 2 may continuously perform sensing of the target area a plurality of times while autonomously moving so that data on the entire target area is included in the short-distance sensing data without receiving the above commands from the vehicle body control unit 33c.

The abnormality determination unit 33d determines whether or not an abnormality has occurred in the target area extracted by the target area extraction unit 33b on the basis of the short-distance sensing data acquired by the sensing data acquisition unit 33a. That is, whether or not an abnormality has occurred in the target area extracted by the target area extraction unit 33b is definitely judged. For example, more accurate abnormality determination may be performed based on the short-distance sensing data to determine whether or not an abnormality has occurred in the target area.

For more accurate abnormality determination, for example, machine learning may be used. In this case, a trained model learned from training data in which the short-distance sensing data is input and the presence or absence of abnormality occurrence is output is used. The abnormality determination unit 33d inputs short-distance sensing data obtained by short-distance sensing by the UGV 2 to the trained model, thereby obtaining, as an output, whether or not an abnormality has occurred in the target area subjected to short-distance sensing. As a result, the abnormality determination unit 33d can determine whether or not an abnormality has occurred in the target area. Incidentally, whether an abnormality has occurred in the target area may be determined by an analysis algorithm other than machine learning.

The information providing unit 33e transmits the short-distance sensing data acquired by the sensing data acquisition unit 33a to a manager terminal of a manager of either a plant or soil via the communication unit 31 after the manager logs in with his/her authentication information through the manager terminal. As a result, the manager can confirm the short-distance sensing data and investigate in more detail whether a disease occurs in a plant (for example, lawn, crops, or the like). According to the investigation result, the manager may give an instruction of appropriate treatment, for example, spraying of a chemical agent, spraying of a fertilizer, spraying of water, spraying of sand, lawn mowing or the like. Here, in a case where the sensing area is a golf course, the manager is, for example, a lawn manager. Alternatively, in a case where the sensing area is a farm field, the manager is, for example, a manager (producer) of crops or the like. Incidentally, as described above, the short-distance sensing data including a plurality of still images or moving images obtained by the UGV 2 continuously performing short-distance sensing on the target area a plurality of times is transmitted to the manager terminal.

Moreover, the information providing unit 33e may transmit to a display terminal the information regarding the target area extracted by the target area extraction unit 33b on the basis of the short-distance sensing data acquired by the sensing data acquisition unit 33a to display the information. As a result, it is possible for a manager to visually grasp information regarding the extracted target area. Incidentally, the display terminal may be a manager terminal or a terminal used by a user or a worker of the sensing area. Moreover, the information regarding the target area may be, for example, a map image (for example, an RGB image, a vegetation activity image, or a thermal image) in the target area. A name, position information, and the like of the map area (for example, the name of the golf course) or the target area may be superimposed and displayed on the map image.

[2. Operation of Sensing System S]

Next, the operation of the sensing system S will be described separately in Examples 1 to 5. Incidentally, in the operation of the sensing system S, the management server 3 manages the flying object ID of the UAV 1 used for long-distance sensing in association with the traveling object ID of the UGV 2 used for short-distance sensing. Then, the UAV 1 sequentially transmits its own position information and the flying object ID to the management server 3 during flight, and the UGV 2 sequentially transmits its own position information and the traveling object ID to the management server 3 during traveling.

Example 1

Figure 9:
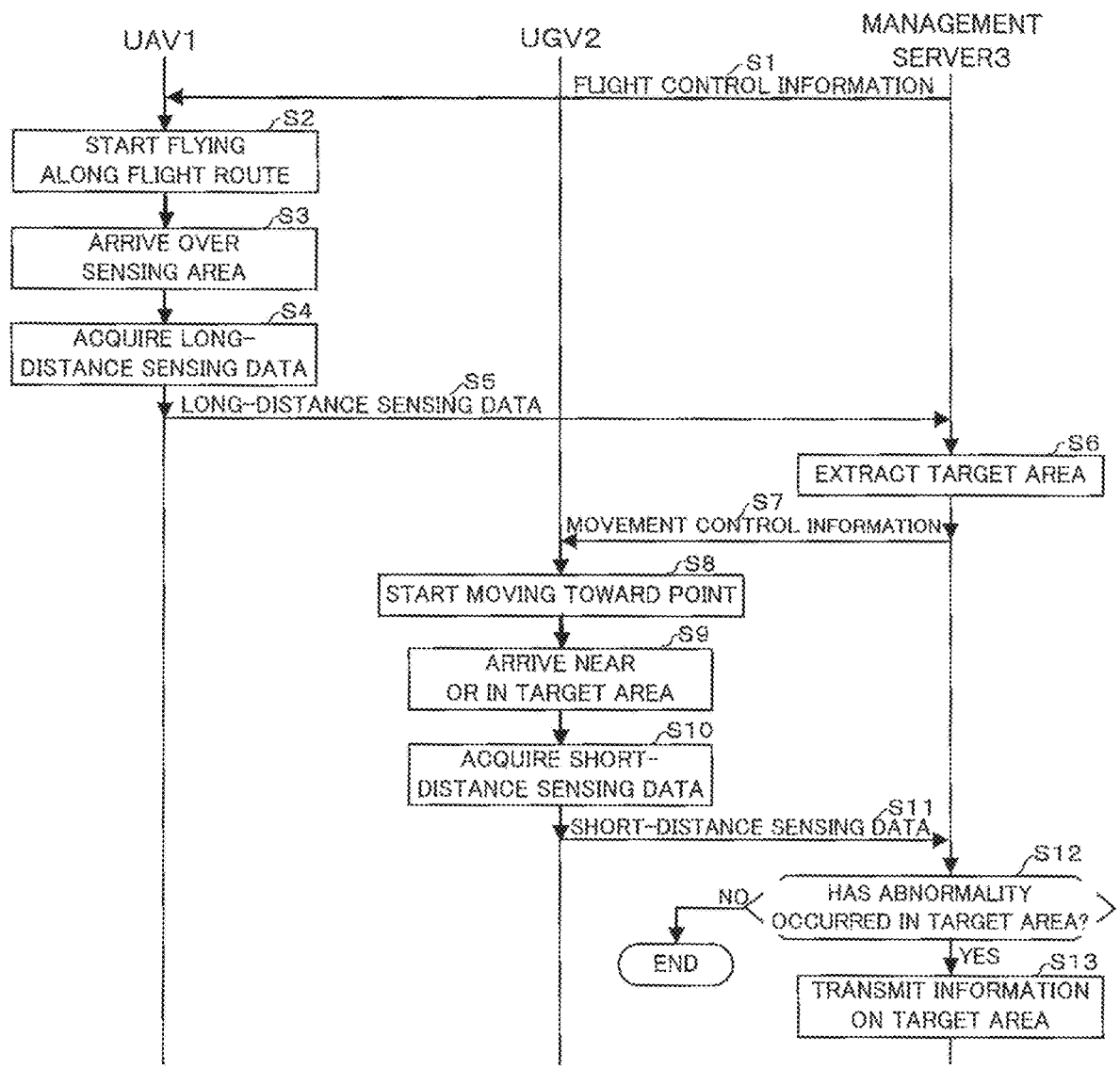
FIG. 9 is a sequence diagram illustrating an example of processing executed among the UAV 1, the UGV 2, and the management server 3 in Example 1.

First, the operation of the sensing system S according to Example 1 will be described with reference to FIG. 9. FIG. 9 is a sequence diagram illustrating an example of processing executed among the UAV 1, the UGV 2, and the management server 3 in Example 1. In FIG. 9, the management server 3 transmits flight control information including a flight command along a flight route to the sensing area to the UAV 1 via the communication network NW (step S1).

Next, upon acquiring (receiving) the flight control information from the management server 3, the UAV 1 starts flying along the flight route to the sensing area (step S2). Next, when arriving over the sensing area (step S3), the UAV 1 activates the sensor unit 13 to start long-distance sensing, and acquires long-distance sensing data obtained by performing long-distance sensing the lower place of the UAV 1 (step S4). Incidentally, the long-distance sensing may be performed while the UAV 1 moves or while hovering. Next, the UAV 1 transmits the long-distance sensing data acquired in step S4 and the flying object ID of the DAV 1 to the management server 3 via the communication network NW (step S5).

Next, upon acquiring the long-distance sensing data and the flying object ID from the UAV 1, the management server 3 extracts a target area sensed by the UGV 2 on the basis of the long-distance sensing data (step S6). For example, the UGV 2 is identified based on the traveling object ID associated with the flying object ID acquired from the management server 3 together with the long-distance sensing data. Next, the management server 3 transmits movement control information including a movement command for moving the UGV 2 to the target area extracted in step S6 to the UGV 2 via the communication network NW (step S7). Such movement control information includes position information of the extracted target area.

Next, upon acquiring the movement control information from the management server 3, the UGV 2 starts moving toward the target area (step S8). Next, when arriving near or in the target area (step S9), the UGV 2 activates the sensor unit 23 to start short-distance sensing, and acquires short-distance sensing data obtained by performing short-distance sensing on a whole or a part of the target area (step S10). Next, the UGV 2 transmits the short-distance sensing data acquired in step S10 and the traveling object ID of the UGV 2 to the management server 3 via the communication network NW (step S11).

Next, upon acquiring the short-distance sensing data and the traveling object ID from the UGV 2, the management server 3 determines whether or not an abnormality has occurred in the target area extracted in step S6 on the basis of the short-distance sensing data (step S12). When it is determined that no abnormality has occurred in the target area (step S12: NO), the process ends.

On the other hand, when it is determined that an abnormality has occurred in the target area (step S12: YES), an e-mail describing a uniform resource locator (URL) for accessing the information regarding the target area extracted in step S6 (for example, a map image in the target area) is sent to the e-mail address of a manager involved in the sensing area (step S13). The e-mail thus sent is received and displayed by a manager terminal of the manager. Then, by specifying the URL described in the e-mail, the information regarding the target area is displayed by the manager terminal.

Example 2

Figure 10:
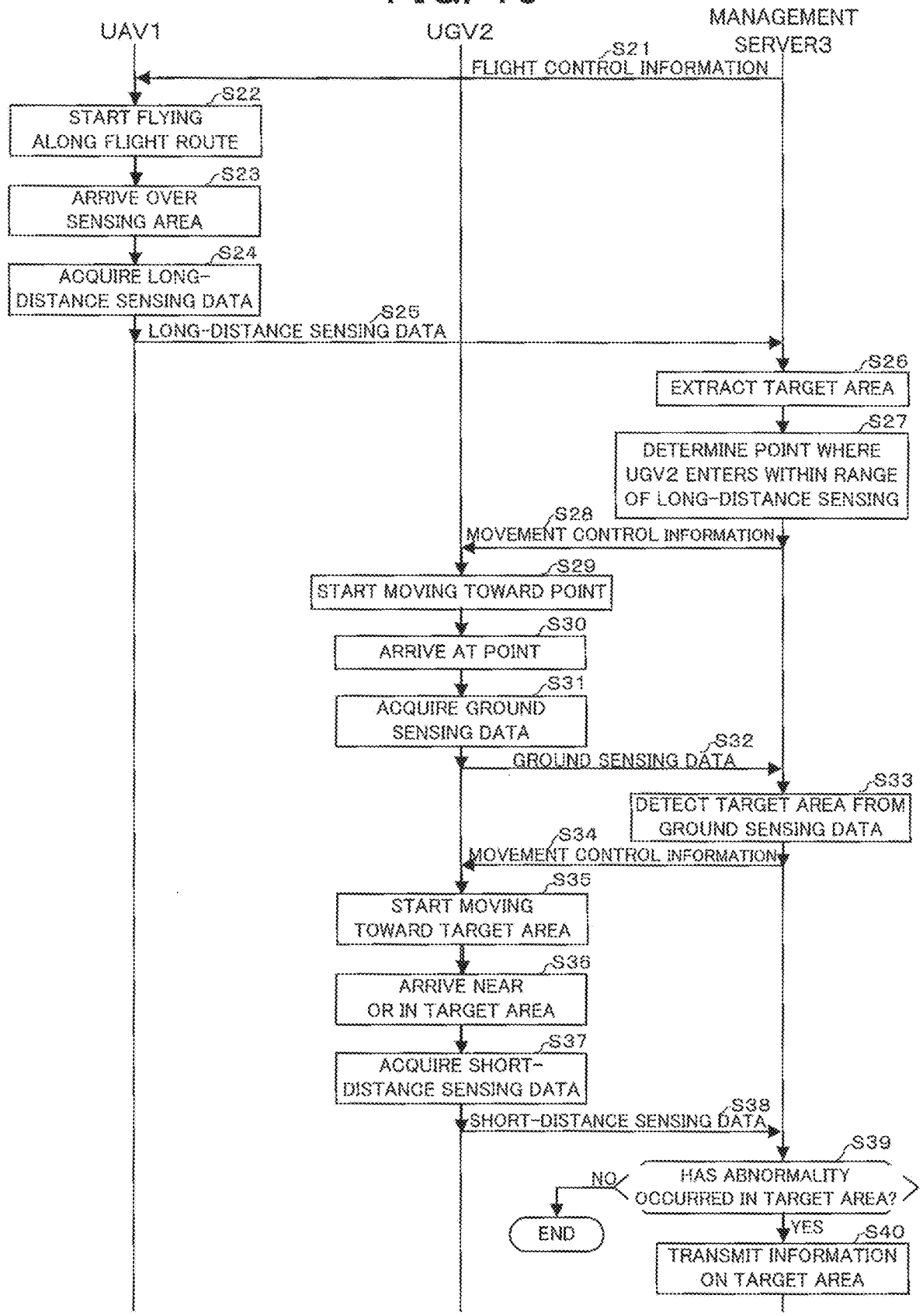
FIG. 10 is a sequence diagram illustrating an example of processing executed among the UAV 1, the UGV 2, and the management server 3 in Example 2.

Next, the operation of the sensing system S according to Example 2 will be described with reference to FIG. 10. Example 2 is an example of a case where the UGV 2 moves toward the target area on the basis of the result of matching between the long-distance sensing data and ground sensing data performed by the management server 3. FIG. 10 is a sequence diagram illustrating an example of processing executed among the UAV 1, the UGV 2, and the management server 3 in Example 2. Incidentally, the processes of steps S21 to S26 illustrated in FIG. 10 are similar to the processes of steps S1 to S6 illustrated in FIG. 9. In step S27, the management server 3 determines a point where the UGV 2 enters within the range of the long-distance sensing performed by the UAV 1 (for example, the photographing range of the camera of the UAV 1) on the basis of the position information of the UAV 1 and the position information of the UGV 2. Next, the management server 3 transmits movement control information including a movement command for moving the UGV 2 to the point determined in step S27 to the UGV 2 via the communication network NW (step S28). Such movement control information includes position information of the determined point.

Next, upon acquiring the movement control information from the management server 3, the UGV 2 starts moving toward the point (step S29). Next, when arriving at the point indicated by the movement control information (step S30), the UGV 2 activates the sensor unit 23 to start ground sensing, and acquires ground sensing data obtained by performing ground sensing (step S31). Next, the UGV 2 transmits the ground sensing data acquired in step S31 and the traveling object ID of the UGV 2 to the management server 3 via the communication network NW (step S32).

Next, upon acquiring the ground sensing data and the traveling object ID, the management server 3 matches the long-distance sensing data with the ground sensing data, and detects the target area extracted in step S26 from the ground sensing data (step S33). Next, the management server 3 transmits movement control information including a movement command for moving the UGV 2 to the target area detected in step S33 to the UGV 2 via the communication network NW (step S34). Incidentally, the processes of steps S35 to S40 illustrated in FIG. 10 are similar to the processes of steps S8 to S13 illustrated in FIG. 9.

Example 3

Figure 11:
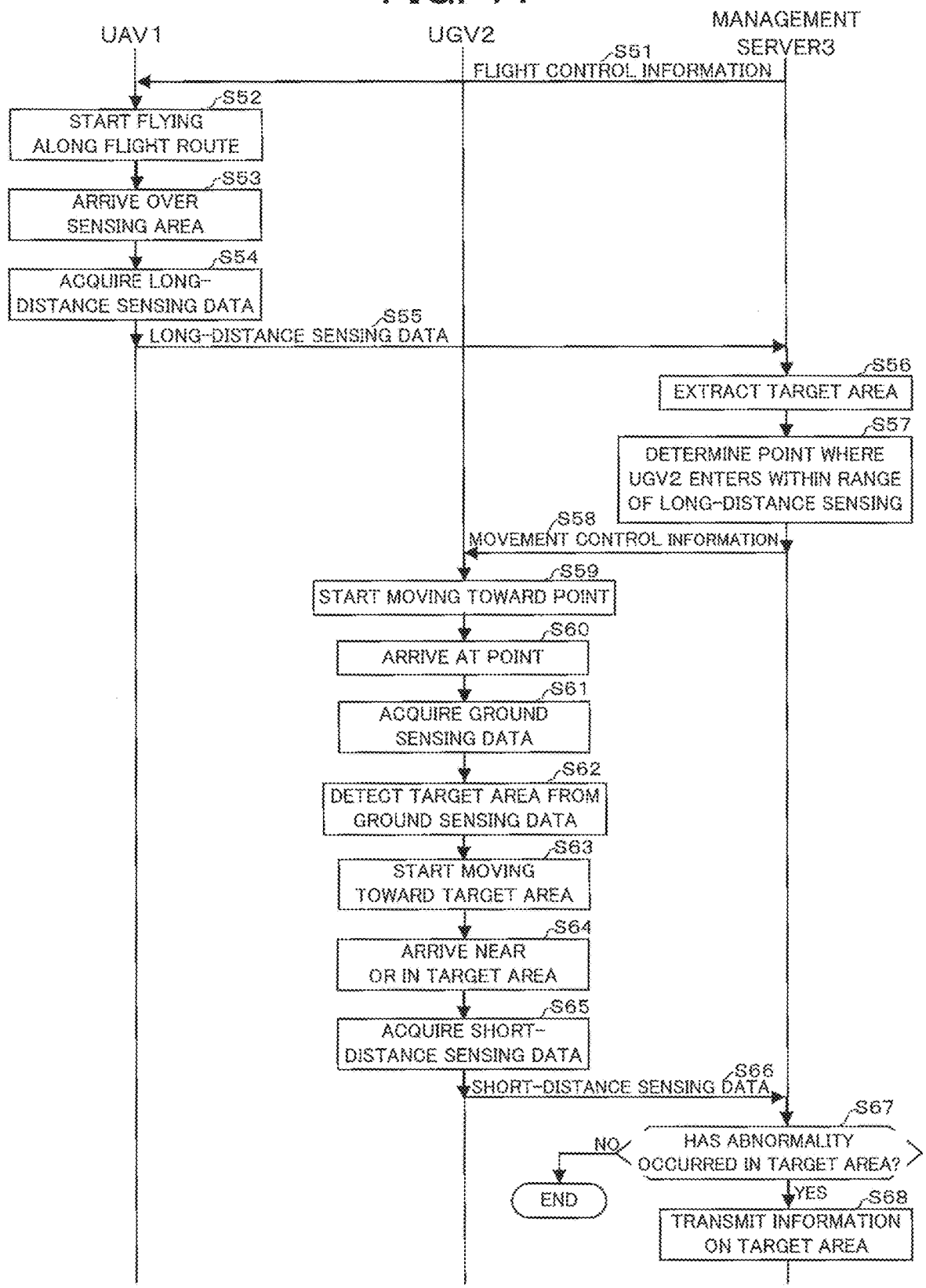
FIG. 11 is a sequence diagram illustrating an example of processing executed among the UAV 1, the UGV 2, and the management server 3 in Example 3.

Next, the operation of the sensing system S according to Example 3 will be described with reference to FIG. 11. Example 3 is an example of a case where the UGV 2 moves toward the target area on the basis of the result of matching between the long-distance sensing data and ground sensing data performed by the UGV 2. FIG. 11 is a sequence diagram illustrating an example of processing executed among the UAV 1, the UGV 2, and the management server 3 in Example 3. Incidentally, the processes of steps S51 to S57 illustrated in FIG. 11 are similar to the processes of steps S21 to S27 illustrated in FIG. 10. In step S58, the management server 3 transmits the long-distance sensing data indicating the target area extracted in step S56 and the movement control information including the movement command for moving the UGV 2 to the target area through the point determined in step S57 to the UGV 2 via the communication network NW. Such movement control information includes position information of the determined point.

Next, upon acquiring the long-distance sensing data and the movement control information from the management server 3, the UGV 2 starts moving toward the point (step S59). Next, when arriving at the point indicated by the movement control information (step S60), the UGV 2 activates the sensor unit 23 to start ground sensing, and acquires ground sensing data obtained by performing ground sensing (step S61). Next, the UGV 2 matches the long-distance sensing data acquired from the management server 3 with the ground sensing data acquired in step S61, and detects the target area indicated by the long-distance sensing data from the ground sensing data (step S62). Next, while performing ground sensing, the UGV 2 starts moving toward the target area detected from the ground sensing data (step S63). Incidentally, the processes of steps S64 to S68 illustrated in FIG. 11 are similar to the processes of steps S36 to S40 illustrated in FIG. 10.

Example 4

Figure 12:
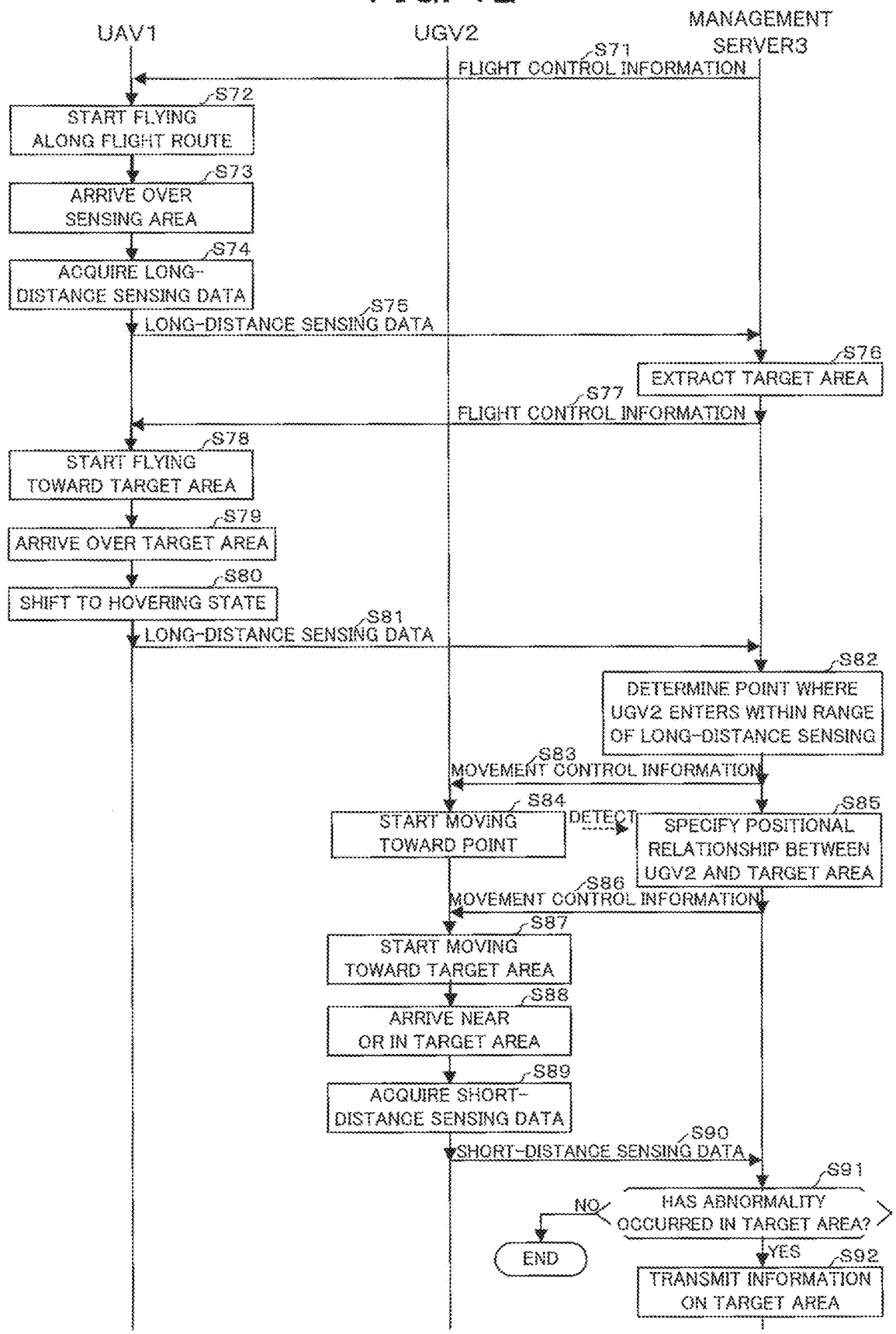
FIG. 12 is a sequence diagram illustrating an example of processing executed among the UAV 1, the UGV 2, and the management server 3 in Example 4.

Next, the operation of the sensing system S according to Example 4 will be described with reference to FIG. 12. Example 4 is an example of a case where the UGV 2 moves toward the target area on the basis of the positional relationship between the target area and the UGV 2 specified by the management server 3. FIG. 12 is a sequence diagram illustrating an example of processing executed among the UAV 1, the UGV 2, and the management server 3 in Example 4. Incidentally, the processes of steps S71 to S76 illustrated in FIG. 12 are similar to the processes of steps S1 to S6 illustrated in FIG. 9. In step S77, the management server 3 transmits flight control information including a flight command for flying the UAV 1 to the target area extracted in step S76 to the UAV 1 via the communication network NW.

Next, upon acquiring the flight control information from the management server 3, the UAV 1 starts flying toward the target area (step S78). Next, when the UAV 1 arrives over the target area (step S79), the UAV 1 interrupts its movement over the target area and then shifts to a hovering state (step S80). Next, the UAV 1 transmits the long-distance sensing data acquired by performing long-distance sensing and the flying object ID to the management server 3 via the communication network NW (step S81). The long-distance sensing data is continuously and repeatedly transmitted to the management server 3.

Next, upon acquiring the long-distance sensing data and the flying object ID from the UAV 1, the management server 3 determines a point where the UGV 2 enters within the range of the long-distance sensing performed by the UAV 1 (for example, the photographing range of the camera of the UAV 1) on the basis of the position information of the UAV 1 in the hovering state and the position information of the UGV 2 (step S82). Next, the management server 3 transmits movement control information including a movement command for moving the UGV 2 to the point determined in step S82 to the UGV 2 via the communication network NW (step S83).

Next, upon acquiring the movement control information from the management server 3, the UGV 2 starts moving toward the point (step S84). While the UGV 2 is moving toward the point, the long-distance sensing data from the UAV 1 is continuously and repeatedly received by the management server 3.

Next, when the UGV 2 enters the range of the long-distance sensing performed by the UAV 1 whereby the management server 3 detects the UGV 2 from the long-distance sensing data continuously received from the UAV 1, the management server 3 specifies (acquires) a positional relationship between the UGV 2 and the target area on the basis of the long-distance sensing data (step S85). Such positional relationship indicates, for example, a direction of the target area with reference to the UGV 2 and a distance between the UGV 2 and the target area. Next, the management server 3 transmits movement control information including a movement command for moving the UGV 2 to the target area extracted in step S76 to the UGV 2 via the communication network NW (step S86). Such movement control information includes information indicating the above-described positional relationship that changes from moment to moment, and may be continuously and repeatedly transmitted to the UGV 2 until the UGV 2 arrives at the target area.

Next, upon acquiring the movement control information from the management server 3, the UGV 2 starts moving toward the target area on the basis of the positional relationship between the UGV 2 and the target area (step S87). That is, the UGV 2 moves in the direction indicated by the positional relationship by the distance indicated by the positional relationship. Incidentally, the UGV 2 may move toward the target area according to the above-described positional relationship that changes from moment to moment in the movement control information repeatedly received from the management server 3 before arriving at the target area. Incidentally, the processes of steps S88 to S92 illustrated in FIG. 12 are similar to the processes of steps S9 to S13 illustrated in FIG. 9.

Example 5

Next, the operation of the sensing system S according to Example 5 will be described with reference to FIG. 13. Example 5 is an example of a case where the UGV 2 moves toward the target area on the basis of the positional relationship between the target area and the UGV 2 specified by the UAV 1. FIG. 13 is a sequence diagram illustrating an example of processing executed among the UAV 1, the UGV 2, and the management server 3 in Example 5. Incidentally, the processes of steps S101 to S114 illustrated in FIG. 13 are similar to the processes of steps S71 to S84 illustrated in FIG. 12.

When the UGV 2 enters the range of long-distance sensing whereby the UAV 1 detects the UGV 2 from the long-distance sensing data, the UAV 1 specifies the positional relationship between the UGV 2 and the target area on the basis of the long-distance sensing data (step S115). Next, the UAV 1 transmits movement control information including a movement command for moving the UGV 2 to the target area indicated by the flight control information acquired in step S107 to the UGV 2 by the short-distance radio communication function (step S116). Such movement control information includes information indicating the above-described positional relationship that changes from moment to moment, and may be continuously and repeatedly transmitted to the UGV 2 until the UGV 2 arrives at the target area.

Next, upon acquiring the movement control information from the UAV 1, the UGV 2 starts moving toward the target area on the basis of the positional relationship between the UGV 2 and the target area (step S117). Incidentally, the UGV 2 may move toward the target area according to the above-described positional relationship that changes from moment to moment in the movement control information repeatedly received from the UAV 1 before arriving at the target area. Incidentally, the processes of steps S118 to S122 illustrated in FIG. 13 are similar to the processes of steps S88 to S92 illustrated in FIG. 12.

As described above, according to the above embodiment, the sensing system S is configured to extract the target area to be subjected to short-distance sensing by the UGV 2 on the basis of the long-distance sensing data obtained by the UAV 1 in the air performing long-distance sensing downward, perform movement control for moving the UGV 2 toward the target area, and acquire short-distance sensing data obtained by performing short-distance sensing on the whole or a part of the target area by the UGV 2 that has moved according to the movement control. Therefore, in order to quickly find and investigate the target area, it is possible to acquire suitable sensing data in consideration of advantages of both comprehensive long-distance sensing and fine short-distance sensing.

Namely, according to the present embodiment, it is possible to quickly find, for example, a target area having a high probability that an abnormality has occurred below the UAV 1 by the comprehensive long-distance sensing by the UAV 1, and thereafter, it is possible to investigate the target area in detail by the fine short-distance sensing by the UGV 2. Therefore, since the UAV 1 does not need to sense a lower place while flying at a low altitude, it is possible to prevent the UAV 1 from becoming unstable due to the ground effect. Moreover, since the UAV 1 does not need to sense the surroundings in a state where the DAV 1 has landed, it is possible to prevent the UAV 1 from becoming unstable and to suppress the consumption of energy (battery ox fuel) for take-off and landing of the UAV 1, Furthermore, since the UAV 1 does not need to perform sensing from the sky using a high-magnification sensor, it is possible to avoid an adverse effect given to the sensing by vibration or the like of the UAV 1. Furthermore, according to the present embodiment, it is possible to quickly and accurately determine whether an abnormality has occurred in the target area using sensing data in consideration of advantages of both comprehensive sensing and fine sensing.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, management of lawn in a golf course and management of crops and the like in a farm field are assumed, but the present invention can be suitably applied to find a place where an abnormality occurs from a wide range in addition to these management. For example, the present invention is also applicable to road management and the like. In this case, for example, an area having a high probability that a crack has occurred on a road or an area having a high probability that an inclination or unevenness equal to or greater than a threshold value has occurred on a road is extracted as the target area. Moreover, in the above embodiment, a manned aerial vehicle has been described as an example of the flying object, but the flying object is also applicable to a manned aerial vehicle that can fly even if there is no pilot in the aerial vehicle.

Moreover, in the above embodiment, an example has been described in which the sensing data acquisition unit 33*a*, the target area extraction unit 33*b*, the vehicle body control unit 33*c*, the abnormality determination unit 33*d*, and the information providing unit 33*e* are provided in the control unit 33 of the management server 3. However, all or some of these components may be provided in the control unit 15 of the UAV 1 or the control unit 25 of the UGV 2. For example, by extracting a target area to be subjected to short-distance sensing on the basis of the long-distance sensing data and transmitting the above-described movement control information to the UGV 2 by the short-distance wireless communication function, the control unit 15 of the UAV 1 may perform movement control for moving the UGV 2 toward the target area. Moreover, the control unit 15 of the UAV 1 may acquire short-distance sensing data from the UGV 2 or the management server 3 and determine whether or not an abnormality has occurred in the target area on the basis of the short-distance sensing data. Moreover, the control unit 15 of the UAV 1 may transmit the short-distance sensing data to the manager terminal, or may display information regarding the target area on the basis of the short-distance sensing data on the display terminal. Alternatively, by acquiring long-distance sensing data from the UAV 1 or the management server 3, and extracting a target area to be subjected to short-distance sensing on the basis of the long-distance sensing data, the control unit 25 of the UGV 2 may perform movement control for moving the UGV 2 toward the target area. Moreover, the control unit 25 of the UGV 2 may determine whether or not an abnormality has occurred in the target area on the basis of the short-distance sensing data. Moreover, the control unit 25 of the UGV 2 may transmit the short-distance sensing data to the manager terminal, or may display information regarding the target area on the basis of the short-distance sensing data on the display terminal.

REFERENCE SIGNS LIST

1 UAV
2 UGV
3 Management server
11, 21 Drive unit
12, 22 Radio communication unit
13, 23 Sensor unit
14, 24 Positioning unit
15, 25 Control unit
31 Communication unit
32 Storage unit
33 Control unit
15*a*, 25*a* Sensing control unit
15*b*, 25*b* Sensing data acquisition unit
15*c* Flight control unit
25*c* Movement Control unit
33*a* Sensing data acquisition unit
33*b* Target extraction unit
33*c* Vehicle body control unit
33*d* Abnormality determination unit
33*e* Information providing unit
S Sensing System

The invention claimed is:

1. A sensing system comprising:
at least one memory configured to store program code; and
at least one processor configured to access the program code and operate as instructed by the program code, the program code including:
first acquisition code configured to cause the at least one processor to acquire first sensing data obtained by a flying object in the air sensing a lower place;
extraction code configured to cause the at least one processor to extract a target area sensed by a traveling object capable of traveling on the ground on the basis of the first sensing data;
control code configured to cause the at least one processor to perform movement control for moving the traveling object toward the target area; and
second acquisition code configured to cause the at least one processor to acquire second sensing data obtained by sensing a whole or a part of the target area by the traveling object that has moved according to the movement control,
wherein the extraction code is configured to cause the at least one processor to extract, as the target area, an area where a difference from a predetermined appropriate temperature is equal to or larger than a threshold value in a thermal image included in the first sensing data.

2. The sensing system according to claim 1, the program code further including display control code configured to cause the at least one processor to cause a display terminal to display information regarding the target area on the basis of the second sensing data.

3. The sensing system according to claim 1, wherein the extraction code causes the at least one processor to extract, as the target area, an area having a high probability that an abnormality has occurred in the lower place, on the basis of the first sensing data.

4. The sensing system according to claim 3, wherein the abnormality is an abnormality of any one of a plant, soil, and a road.

5. The sensing system according to claim 4, the program code further including transmission code configured to cause the at least one processor to transmit the second sensing data to a terminal owned by a manager of any one of the plant, the soil, and the road.

6. The sensing system according to claim 1, wherein the first sensing data includes a vegetation activity image, and
the extraction code causes the at least one processor to extract the target area on the basis of an activity in the vegetation activity image.

7. The sensing system according to claim 1, wherein the second sensing data includes data related to at least one of moisture content, temperature, salinity concentration, electrical conductivity, and acidity in the ground of the target area.

8. The sensing system according to claim 1, wherein the second sensing data is acquired using a sensor inserted in the ground of the target area.

9. The sensing system according to claim 1, the program code further including determination code configured to cause the at least one processor to determine whether or not an abnormality has occurred in the target area on the basis of the second sensing data.

10. The sensing system according to claim 1, wherein the control code causes the at least one processor to cause the traveling object to continuously perform sensing of the target area a plurality of times while moving the traveling object so that data on the entire target area is included in the second sensing data.

11. The sensing system according to claim 1, the program code further including third acquisition code configured to cause the at least one processor to acquire third sensing data obtained by sensing the ground by the traveling object before the traveling object is moved toward the target area,
wherein the control code causes the at least one processor to perform movement control for moving the traveling object toward the target area on the basis of the first sensing data and the third sensing data.

12. The sensing system according to claim 11, wherein the control code causes the at least one processor to perform movement control for moving the traveling object toward the target area detected from the third sensing data by matching the first sensing data with the third sensing data.

13. The sensing system according to claim 1, wherein when the target area is extracted, the control code causes the at least one processor to move the traveling object into a range of the sensing performed by the flying object in a hovering state, and thereafter, performs movement control for moving the traveling object toward the target area on the basis of the first sensing data.

14. The sensing system according to claim 13, wherein the flying object performs the sensing while moving along a predetermined flight route, and
when the target area is extracted, the control code causes the at least one processor to cause the flying object to interrupt the movement along the route and then shift to the hovering state.

15. The sensing system according to claim 1, wherein a distance between the target area and the flying object is longer than a distance between the target area and the traveling object.

16. The sensing system according to claim 1, wherein a range of the sensing performed by the flying object is larger than a range of the sensing performed by the traveling object.

17. The sensing system of claim 1, wherein the extraction code is configured to cause the at least one processor to extract, as the target area, an area where a difference from a predetermined appropriate plant color is equal to or larger than a threshold value in an RGB image included in the first sensing data.

18. A sensing data acquisition method including:
acquiring first sensing data obtained by a flying object in the air sensing a lower place;
extracting a target area sensed by a traveling object capable of traveling on the ground on the basis of the first sensing data;
performing movement control for moving the traveling object toward the target area; and
acquiring second sensing data obtained by sensing a whole or a part of the target area by the traveling object that has moved according to the movement control,
wherein the extracting comprises extracting, as the target area, an area where a difference from a predetermined appropriate temperature is equal to or larger than a threshold value in a thermal image included in the first sensing data.

19. A control device comprising:
at least one memory configured to store program code; and
at least one processor configured to access the program code and operate as instructed by the program code, the program code including:
first acquisition code configured to cause the at least one processor acquire first sensing data obtained by a flying object in the air sensing a lower place;
extraction code configured to cause the at least one processor to extract a target area sensed by a traveling object capable of traveling on the ground on the basis of the first sensing data;
control code configured to cause the at least one processor to perform movement control for moving the traveling object toward the target area; and
second acquisition code configured to cause the at least one processor to acquire second sensing data obtained by sensing a whole or a part of the target area by the traveling object that has moved according to the movement control,
wherein the extraction code is configured to cause the at least one processor to extract, as the target area, an area where a difference from a predetermined appropriate temperature is equal to or larger than a threshold value in a thermal image included in the first sensing data.

* * * * *